(12) United States Patent
Dackefjord (10) Patent No.: US 12,457,475 B2
(45) Date of Patent: Oct. 28, 2025

(54) WIRELESS REAL TIME POSITIONING SYSTEM

(71) Applicant: NIDA TECH SWEDEN AB, Malmö (SE)

(72) Inventor: Håkan Dackefjord, Älvsjö (SE)

(73) Assignee: NIDA TECH SWEDEN AB, Malmö (SE)

( * ) Notice: Subject to any disclaimer, the term of this patent is extended or adjusted under 35 U.S.C. 154(b) by 115 days.

(21) Appl. No.: 18/577,946

(22) PCT Filed: Jun. 17, 2022

(86) PCT No.: PCT/EP2022/066553
§ 371 (c)(1),
(2) Date: Jan. 9, 2024

(87) PCT Pub. No.: WO2023/285070
PCT Pub. Date: Jan. 19, 2023

(65) Prior Publication Data
US 2024/0388872 A1    Nov. 21, 2024

(30) Foreign Application Priority Data
Jul. 13, 2021  (SE) ................................. 2150934-4

(51) Int. Cl.
*G08B 1/08* (2006.01)
*G01S 5/02* (2010.01)
(Continued)

(52) U.S. Cl.
CPC .......... *H04W 4/029* (2018.02); *G01S 5/0226* (2013.01); *G01S 5/14* (2013.01); *G01S 13/876* (2013.01)

(58) Field of Classification Search
CPC ....... H04W 4/029; H04W 4/02; H04W 64/00; H04W 4/33; G01S 5/0226; G01S 5/14;
(Continued)

(56) References Cited

U.S. PATENT DOCUMENTS 9,619,989 B1 *  4/2017  Ewing ................... H04L 49/201
11,856,483 B2 * 12/2023  Kratz ...................... H04L 27/22
(Continued)

OTHER PUBLICATIONS

Al-Qudsi Belal et al,"A hybrid TDoA/RSSI model for mitigating NLOS errors in FMCW based indoor positioning systems", 2015 11th Conference on Ph.D. Research in Microelectronics and Electronics (PRIME), IEEE, (Jun. 29, 2015), doi:10.1109/PRIME.2015. 7251342, pp. 93-96, XP033200759 [Y] 1-4,6-13, 15-20,22 * abstract * * p. 93, col. I, paragraph-col. r, paragraph 1 * * p. 94, col. I, paragraph 2 * * p. 95, col. I, paragraph I * * p. 96, col. r, paragraph 1 * [A] 5,14,21 DOI: http://dx.doi.org/10.1109/.
(Continued)

*Primary Examiner* — Tai T Nguyen
(74) *Attorney, Agent, or Firm* — DUANE MORRIS LLP; Gregory M. Lefkowitz (57) ABSTRACT

A wireless real time positioning method and system, the system comprises multiple mesh tags (314, 414) and a target tag (310, 410), the method comprises: sending a broadcast message from the target tag (310, 410); receiving the broadcast message in each mesh tag (314, 414); measure a Received Signal Strength Indicator (RSSI) of the received broadcast message in each mesh tag (314, 414); transmitting the RSSI from each mesh tag (314, 414) to said target tag (310, 410); selecting, in the target tag (310, 410), one subset of mesh tags (314, 414) having the highest RSSI as proximity tags (314-2, 314-3, 314-5, 314-6); performing a Time of Flight (ToF) measurement, in the target tag (310, 410), with all the selected proximity tags (314-2, 314-3, 314-5, 314-6); calculating, in the target tag (310, 410), a real time
(Continued)

position of the target tag (310, 410) based on the ToF measurements with all the selected proximity tags (314-2, 314-3, 314-5, 314-6).

13 Claims, 6 Drawing Sheets

(51) Int. Cl.
*G01S 5/14* (2006.01)
*G01S 13/87* (2006.01)
*H04W 4/029* (2018.01)

(58) Field of Classification Search
CPC .... G01S 13/876; G01S 5/0205; G01S 13/765; G01S 5/0063; G01S 5/145; G01S 5/02; G01C 21/206
USPC ...................................................... 340/539.1
See application file for complete search history.

(56) References Cited

U.S. PATENT DOCUMENTS

| | | | |
|---|---|---|---|
| 2003/0030936 A1* | 2/2003 | Smith | G11B 5/59627 360/77.04 |
| 2012/0094683 A1* | 4/2012 | Yoeli | G01S 5/02 455/456.1 |
| 2014/0361928 A1* | 12/2014 | Hughes | G01S 5/0221 342/463 |
| 2016/0266234 A1* | 9/2016 | Pearce | G01S 13/74 |
| 2018/0164398 A1* | 6/2018 | Olsen | G01S 5/021 |

OTHER PUBLICATIONS

Rong Fan et al, "Indoor Localization Error Measurements with Multiple Channels", Networks Security Wireless Communications and Trusted Computing (NSWCTC), 2010 Second International Conference on, IEEE, Piscataway, NJ, USA, (Apr. 24, 2010), ISBN 978-0-7695-4011-5, pp. 176-179, XP031687111 [Y] 1-4,6-13,15-20,22 * p. 177, col. I, paragraph 1 * [A] 5,14,21.

* cited by examiner

WIRELESS REAL TIME POSITIONING SYSTEM

CROSS-REFERENCE TO RELATED APPLICATIONS

This application is a § 371 national stage entry of International Application No. PCT/EP2022/066553, filed Jun. 17, 2022, which claims priority to Sweden Application No. 2150934-4, filed Jul. 13, 2021, the entire contents of which are incorporated herein by reference.

TECHNICAL FIELD

The present invention relates generally to a wireless system for real time positioning.

BACKGROUND

Entrepreneurs and construction companies are using various machines and tools on construction sites. This ranges from the self-employed carpenter performing a renovation of a cottage all the way to the large construction company building entire new hospitals, districts, highways, bridges and other major projects. The workers doing the construction uses all kind of tools from pencils and knives all the way to excavators and cranes.

Some of the tools used on construction sites are not that big and moveable, for example different power tools such as drillers, chainsaws, etc., They can be carried to anywhere on the site to accomplish certain jobs and are then often left there. When they are needed next time, the workers on the construction site often spend lots of time looking for the tools because they do not know the location of the tools.

To solve such a problem, every moveable tool may be assigned with an electronic tag. Meanwhile, multiple positioning beacons (PBs) are deployed on proper spots on the site. A positioning beacon is a wireless device that acts as a fixed node with a known position that routes data from electronic tags to other nodes in a network and is used as reference when measuring distance to and the position of the electronic tag. The deployed PBs are configured for two-way radio communication with the electronic tag. The PBs and the electronic tag on the moveable tool are configured to perform a real time positioning of the electronic tag. Thus the position of the moveable tool is defined and the workers can find the tool more efficiently.

A typical method performed between the PBs and the electronic tag is a Received Signal Strength Indicator, RSSI method. The electronic tag broadcasts a message to all the PBs and all the PBs measure a RSSI. The measured RSSIs are transmitted back to the electronic tag so that the electronic tag can calculate its own real time position by the received RSSIs because the positions of the PBs are fixed and known. This method can be performed fast and an approximate position of the electronic tag is obtained.

However, there are two deficiencies of the positioning system in the prior art. The first deficiency is that the PB in the prior art is quite expensive, due to the technical complexity of the PB. One single PB may cost several thousand Swedish krona (SEK) and the construction site needs to deploy multiple PBs to cover all the area on the construction site to guarantee that the moveable tool can be found no matter where it is. Thus the cost of the whole system becomes quite high.

The second deficiency is that the positioning method RSSI may not be accurate due to the complex environment on the construction site. The construction site may include outer walls, floors, inner walls, windows, etc. These different obstacles between PBs and the electronic tag may bring on quite different pathloss, and the RSSIs may vary obviously among different PBs, even if the distances between the PBs and the electronic tag are similar. Thus the calculation of real time position of the electronic tag may become inaccurate.

Based on the analysis above, there is a need to develop a cost effective and accurate real time positioning system to promptly and accurately obtain the real time position of the electronic tag so that the workers on a construction site can find moveable tools efficiently and to a low expense.

SUMMARY

An object of the present invention is to achieve a system that is cost efficient and with which it is possible to determine the position of a moveable object in a prompt and accurate way. This is accomplished with a wireless real time positioning system comprising a mesh network of mesh tags and a target tag provided on a movable object and wherein each mesh tag comprises a first processing unit and a first memory and the target tag comprises a second processing unit and a second memory, said first and second memories comprising instructions which when executed by the processing units cause the system to send a broadcast message from the target tag, receive the broadcast message in at least three mesh tags, measure a Received Signal Strength Indicator, RSSI, of the received broadcast message in the at least three mesh tags, transmit the RSSI from the at least three mesh tags to said target tag, select, in the target tag, one subset of mesh tags having the highest RSSI as proximity tags, perform a Time of Flight, ToF, measurement, in the target tag, with all the selected proximity tags, and calculate, in the target tag, a real time position of the target tag based on the ToF measurements with all the selected proximity tags.

In an exemplary embodiment of the system, the target tag is further caused to perform ToF measurements with all the proximity tags in a Round Robin manner, and wherein the target tag is configured with the selected number of proximity tags as the number of Round Robins. The number of Round Robins may be determined based on the quality of the previously measured RSSI measurements, the higher the RSSI quality the fewer Round Robins.

In another exemplary embodiment of the system, the target tag is further caused to send the broadcast message with a bit rate of 5 kbps to 500 kbps, preferable with a bit rate of 50 kbps.

In yet another exemplary embodiment of the system, the target tag is further caused to determine the bit rate of the signal used in said ToF measurement based on the transmitted RSSI from the selected proximity tags, preferably in the range of 50 kbps to 500 kpbs. The target tag may also determine a number of packets transmitted between the target tag and the selected proximity tags in each ToF measurement.

In another exemplary embodiment the system may also comprise a gateway, and the target tag and mesh tags comprised in the system are wirelessly connected to the gateway.

Another object of the present invention is to achieve a wireless mesh tag to be used in the system. This is accomplished with a wireless mesh tag comprising a first processing unit and a first memory and wherein said mesh tag is configured for two-way radio communication with a target tag which is used for real time positioning and provided on a movable object, said first memory comprises instructions which when executed by the first processing unit cause the mesh tag to form a mesh network with other mesh tags, receive a broadcast message sent from said target tag, measure a Received Signal Strength Indicator, RSSI of the received broadcast message, transmit the RSSI to said target tag, perform a Time of Flight, ToF measurement with said target tag if the mesh tag is selected by said target tag as a proximity tag.

In an exemplary embodiment the wireless mesh tag is wirelessly connected to a gateway (318).

Another object of the present invention is to achieve a wireless target tag to be used in the system. This is accomplished with a wireless target tag comprising a second processing unit and a second memory and wherein said target tag is provided on a moveable object and is configured for two-way radio communication with mesh tags in a mesh network, said second memory comprises instructions which when executed by the second processing unit cause the target tag to send a broadcast a message to each mesh tag, receive a Received Signal Strength Indicator, RSSI from at least three mesh tags, select one subset of mesh tags having the highest RSSI as proximity tags, perform a Time of Flight, ToF measurement with all the selected proximity tags, and calculate a real time position of the target tag based on the ToF measurements with all the selected proximity tags.

In an exemplary embodiment the wireless target tag is further caused to perform ToF measurements with all the proximity tags in a Round Robin manner, and wherein the target tag is configured with the selected number of proximity tags as the number of Round Robins. The number of Round Robins may be determined based on the quality of the previously measured RSSI measurements, the higher the RSSI quality the fewer Round Robins.

In yet another exemplary embodiment the wireless target tag is further caused to send the broadcast message with a bit rate of 5 kbps to 500 kbps, preferable with a bit rate of 50 kbps.

In another embodiment the target tag is further caused to determine the bit rate of the signal used in said ToF measurement based on the transmitted RSSI from the selected proximity tags, preferably in the range of 50 kbps to 500 kpbs. The wireless target tag may determine a number of packets transmitted between the target tag and the selected proximity tags in each ToF measurement.

In an exemplary embodiment the wireless target tag is wirelessly connected to a gateway.

Yet another object of the present invention is to achieve a wireless real time positioning method that is cost efficient and with which it is possible to determine the position of a moveable object in a prompt and accurate way. This is accomplished with a wireless real time positioning method performed by a system comprising a mesh network of multiple mesh tags and a target tag provided on a moveable object, the method comprises sending a broadcast message from the target tag, receiving the broadcast message in at least three mesh tags, measuring a Received Signal Strength Indicator, RSSI, of the received broadcast message in the at least three mesh tags, transmitting the RSSI from the at least three mesh tags to said target tag, selecting, in the target tag, one subset of mesh tags having the highest RSSIs as proximity tags, performing a Time of Flight, ToF, measurement, in the target tag, with all the selected proximity tags, and calculating, in the target tag, a real time position of the target tag based on the ToF measurements with all the selected proximity tags.

In an exemplary embodiment of the wireless real time positioning method the ToF measurements with all the proximity tags may be performed in a Round Robin manner, and the selected number of proximity tags is the number of Round Robins. The number of Round Robins may be based on the quality of the previously measured RSSI measurements, the higher the RSSI quality the fewer Round Robins.

In yet another exemplary embodiment of the wireless real time positioning method the broadcast message may be performed with a bit rate of 5 kbps to 500 kbps, preferable with a bit rate of 50 kbps.

In another exemplary embodiment of the wireless real time positioning method the bit rate of the signal used in said ToF measurement may be determined based on the transmitted RSSI from the selected proximity tags, preferably in the range of 50 kbps to 500 kpbs.

In yet another exemplary embodiment of the wireless real time positioning method, the method may determine the number of packets transmitted between the target tag and the proximity tags in each ToF measurement.

BRIEF DESCRIPTION OF THE DRAWINGS

Examples of embodiments herein are described in more detail with reference to the appended schematic drawings, which are briefly described in the following.

DETAILED DESCRIPTION

Throughout the following description similar reference numerals may be used to denote similar elements, units, modules, circuits, nodes, parts, items or features, when applicable. Features that are optional or appear only in some embodiments are, when these features are illustrated in a figure, typically indicated by dashed lines.

Embodiments herein are illustrated by exemplary embodiments. It should be noted that these embodiments are not necessarily mutually exclusive. Components from one embodiment may be tacitly assumed to be present in another embodiment and it will be obvious to a person skilled in the art how those components may be used in the other exemplary embodiments.

Figure 1:
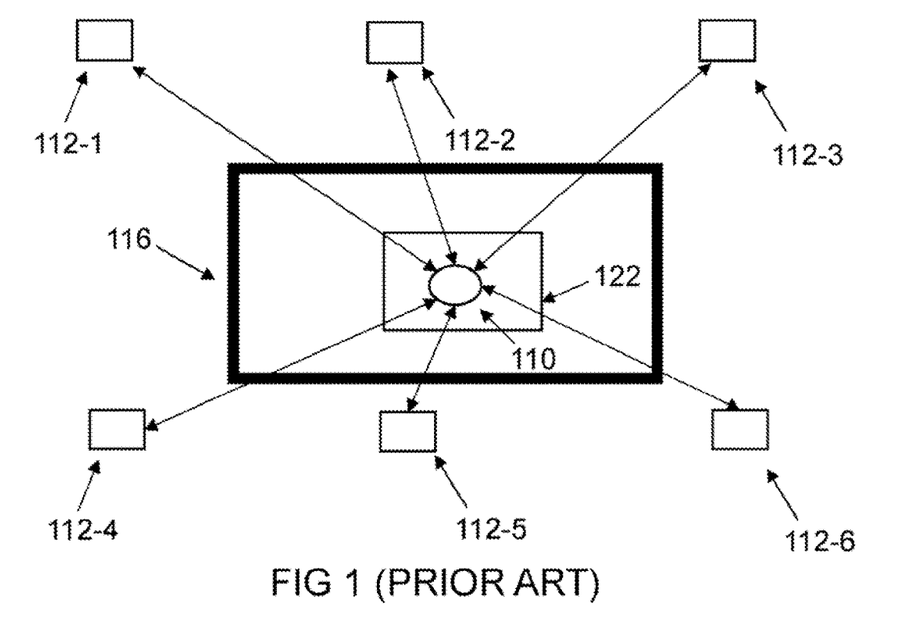
FIG. 1 schematically shows a real time location system in the prior art.

As a development towards embodiments herein, the situation indicated in the Background and ideas underlying embodiments herein will first be discussed. FIG. 1 schematically shows a real time location system on a construction site according to prior art. The real time location system is used to locate a moveable object 130. The real time locations system comprises multiple PBs 112-1 to 112-6 and an electronic tag 110. The electronic tag 110 is deployed on the moveable object 130. The PBs 112-1 to 112-6 and the electronic tag 110 are configured for wireless two-way communication. The environment of the construction site may be complicated. e.g. there is a wall 116 between the PBs and the electronic tag 110. However, this is only an example, the real environment of the construction site may be more sophisticated.

When performing the positioning of the electronic tag 110 on the moveable object 130, the PBs 112-1 to 112-6 are connected to the electronic tag 110 wirelessly. A real time location method is performed in the system and the position of the electronic tag 110 is determined according to the method. The method will be described further in FIG. 2.

However, the real time location system in the prior art has its disadvantage. The deployed PBs are quite expensive and as mentioned above the system needs to deploy multiple PBs to cover every corner of the construction site, so the cost of the whole system may be quite high.

Figure 2:
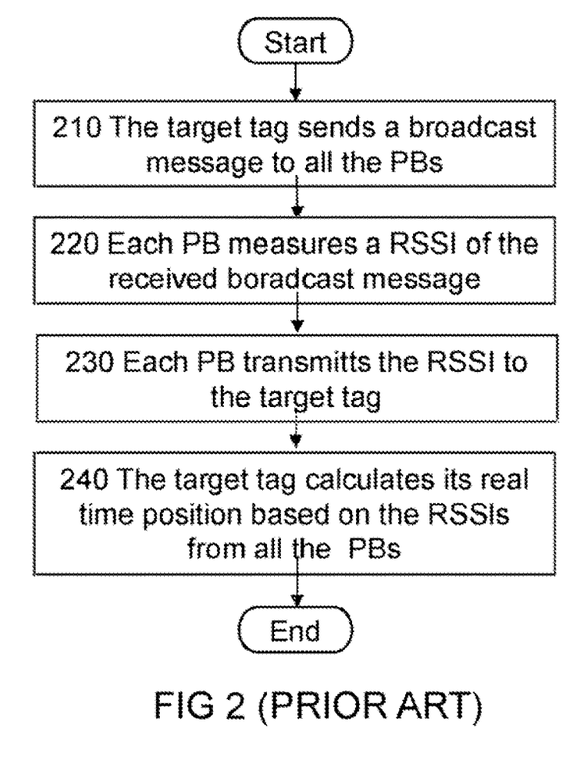
FIG. 2 is a flowchart schematically illustrating embodiments of a method performed in the real time location system in the prior art.

FIG. 2 is a flowchart schematically illustrating embodiments of a method performed in the real time location system of FIG. 1.

The principle of the method is that the signal transmitted from the electronic tag to the PBs will be attenuated on the radio transmission path. If there are obstacles between the electronic tag and a PB, the received signal strength on the PB would be less. Because the sent signal strength from the electronic tag is fixed and known, if we know the received signal strength on the PB, the distance between the electronic tag and the PB can be approximately estimated.

The method includes the following steps and can be called Received Signal Strength Indicator, RSSI method:

Step 210, the electronic tag 110 sends a broadcast message to all the PBs 112-1 to 112-6. The signal strength of the broadcast messages is the same to all the PBs 112-1 to 112-6 and known by the electronic tag 110.

Step 220, each PB 112-1 to 112-6 measures a received signal strength indicator, RSSI, of the received broadcast message.

Step 230, each PB 112-1 to 112-6 transmits the RSSI back to the electronic tag 110. The RSSI was measured by each PB in step 220.

Step 240, the electronic tag 110 calculates its real time position based on the RSSIs from all the PBs 112-1 to 112-6.

The RSSI of the PB depends on how much the transmitted broadcast signal is attenuated when it travels to the receiving PB. The pathloss depends on indoor/outdoor environment, obstacles in different scenarios, etc. The obstacles can be an open area (no obstacles), outer walls, floors, window, inner walls, etc.

An obvious disadvantage is that the obstacles between the electronic tag 110 and one PB (e.g. 112-1) and the obstacles between the electronic tag 110 and another PB (e.g. 112-3) may be quite different. There might be a thick concrete wall between the electronic tag 110 and PB 112-1, but an open area between the electronic tag 110 and PB 112-3. In this situation, the pathloss on the two transmission channels are very different and accordingly the RSSIs are also quite different, even if the distance between the electronic tag 110 and the PB 112-1 and the distance between the electronic tag 110 and the PB 112-3 are similar. This may lead to an inaccurate estimation of the distance based on RSSIs, thus the real time positioning of the electronic tag also becomes inaccurate.

Before the real time location system of the present invention will be described in detail the electronic tag, hereinafter called target tag, and mesh-tags, which will be used instead of the positioning beacons, will be defined. The target tag is a small tag that is easy to use and attach to objects both in an indoor and an outdoor environment. The target tag comprises a processing unit and a memory and is configured with positioning functions and communication capabilities for determining its position in relation to different nodes, such as mesh tags. Optionally the target tag may be provided with several integrated sensors for measuring activity and status of the object to which it is attached.

A mesh-tag is hardware wise the same as the target tag, also comprising a processing unit and a memory, but differently configured as will be apparent by reading the detailed description below. It is when the inventor suddenly realized that it is possible to use small target tags, but with another configuration, that it was possible to realize a real time location system that would be cost efficient and accurate.

Figure 3:
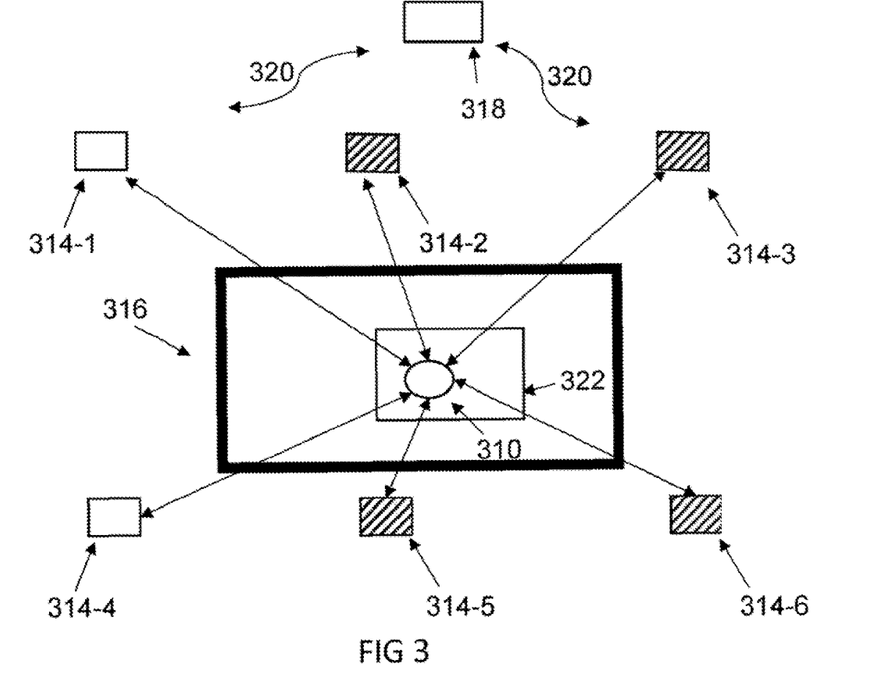
FIG. 3 schematically shows the real time location system according to embodiments herein.

FIG. 3 schematically shows the real time location system according to embodiments herein. The real time location system comprises multiple mesh tags 314-1 to 314-6, and a target tag 310. The target tag 310 is provided on a moveable object 322. The system is used to perform a real time positioning of the target tag 310, thus the real time position of the moveable object 322 is provided. The environment of the real time location system may be complicated, e.g. there might be a wall 316 between the mesh tags 314-1 to 314-6 and the target tag 310.

The mesh tags 314-1 to 314-6 are wirelessly connected to the target tag 310 and can send/receive radio waves to/from the target tag 310. The wireless communication protocol between the mesh tags 314-1 to 314-6 and the target tag 310 can be any general wireless communication protocol, e.g. Bluetooth, BLE, Zigbee based on IEEE 802.15.4, 6LoWPAN, WiFi based on IEEE 802.11 and cellular network protocols GSM, LTE, CDMA, EDGE, 3G, 4G and 5G etc.

The mesh tags 314-1 to 314-6 together form a mesh network that communicate wirelessly with each other. A mesh network is a local network topology in which the infrastructure nodes (i.e. bridges, switches, and other infrastructure devices) connect directly, dynamically and non-hierarchically to as many other nodes as possible and cooperate with one another to efficiently route data from/to clients. In this embodiment, the infrastructure nodes are the mesh tags 314-1 to 314-6. The six mesh tags shown in FIG. 3 are just an example of a mesh network. More or less mesh tags can be used to form a smaller or larger mesh network based on the scale of the construction site. When deploying mesh tags on a site we need to ensure that a target tag always can communicate with at least three mesh tags at any given location of the target tag.

Because the mesh tags have a lower cost than the conventional PB, the cost of the whole mesh network becomes much lower than the network of PBs.

According to another embodiment, all the mesh tags 314-1 to 314-6 and the target tag 310 can be wirelessly connected to a gateway 318 via a wireless data network 320. Thus the data from all the mesh tags 314-1 to 314-6 and the target tag 310 can be uploaded to the gateway 318. Meanwhile, the gateway 318 can also control the mesh tags 314-1 to 314-6 and the target tag 310 via the wireless data network 320.

Figure 4:
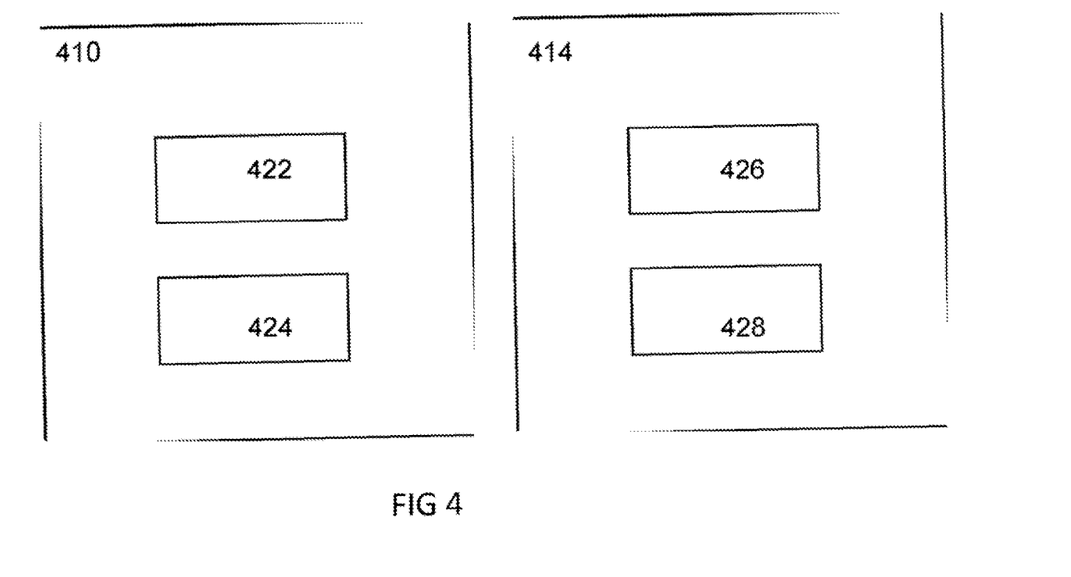
FIG. 4 schematically shows a mesh tag and a target tag in the system according to embodiments herein.

FIG. 4 describes an example of a mesh tag 414 operable in the real time location system. The mesh tag 414 comprises a processing unit 426 and a memory 428. The processing unit 426 is configured to perform the instructions stored in the memory 428. When the instructions in the memory 428 are performed by the processing unit 426, the mesh tag 414 is configured to operate the method illustrated in FIG. 6.

FIG. 4 also describes an example of a target tag 410 in the real time location system. The target tag comprises a processing unit 422 and a memory 424. The processing unit 422 is configured to perform the instructions stored in the memory 424. When the instructions in the memory 424 are performed by the processing unit 422, the target tag 410 is configured to operate the method illustrated in FIG. 7. When the process unit 422 and the process unit 426 coordinate with each other in the real time location system, the method illustrated in FIG. 5 is performed.

Figure 5:
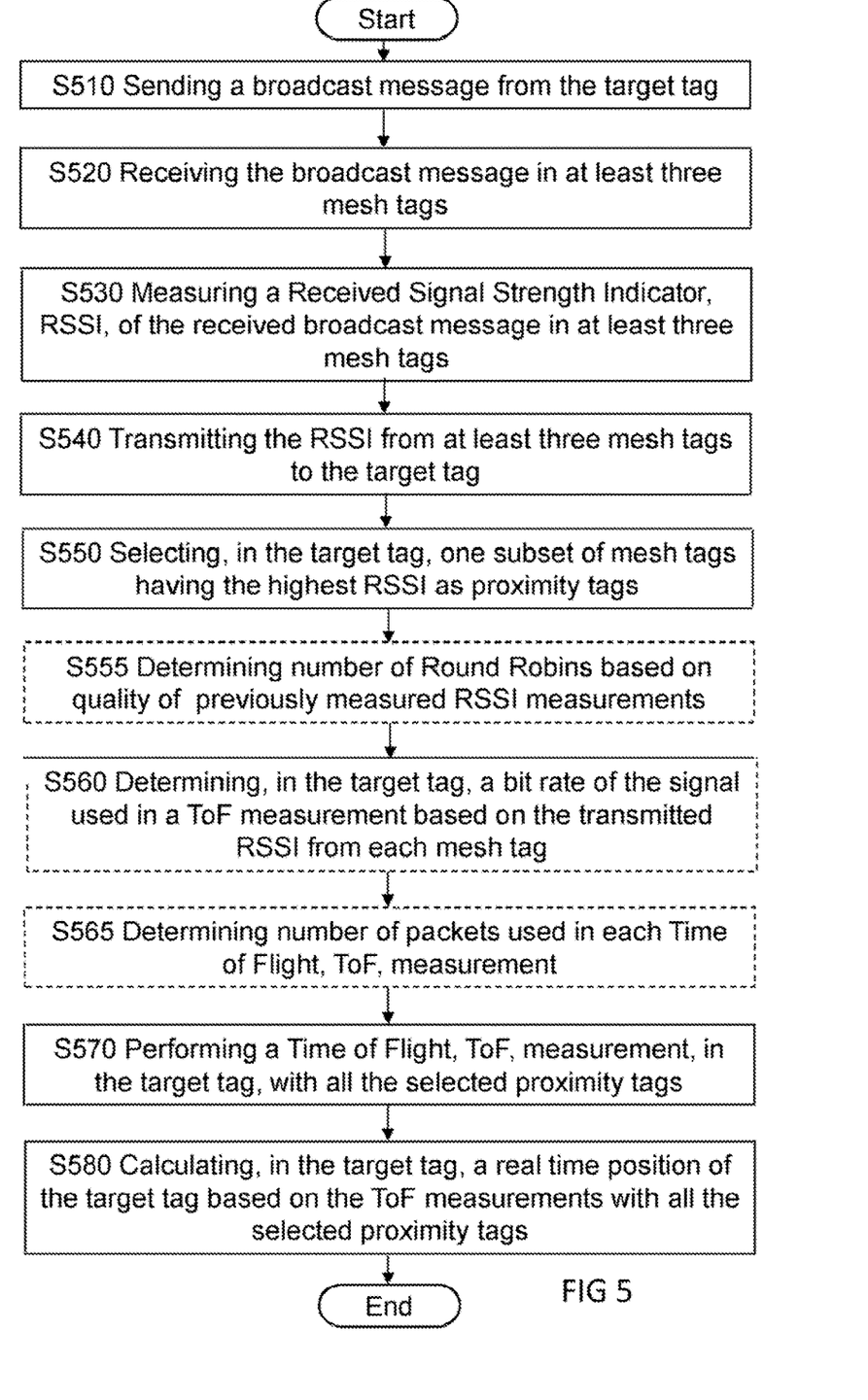
FIG. 5 is a flowchart schematically illustrating embodiments of a method performed in the system according to embodiments herein.

FIG. 5 is a flowchart schematically illustrating embodiments of a method performed in the system according to embodiments herein.

The steps below may be taken in any suitable order and/or be carried out fully or partly overlapping in time when this is possible and suitable.

Step 510

The target tag 310 sends a broadcast message to all the mesh tags 314-1 to 314-6. Depending on how many mesh tags the mesh network comprises not all of the mesh tags may be in a position to actually receive the broadcast message. What is important is that at least three mesh tags receive the broadcast message. The more mesh tags that are capable to receive the broadcast message the better accuracy is obtainable with the positioning system, but of course a very dense mesh networks with short distances between the mesh tags will increase the cost of the positioning system. With at least three mesh tags receiving the broadcast message the accuracy will be sufficient for most purposes.

Step 520

The broadcast message sent from the target tag 310 is s mentioned above received in at least three mesh tags 314-1 to 314-6. As stated above, the different obstacles between the target tag 310 and different mesh tags 314 can cause different pathloss, so that the received signal strength of the broadcast message in each mesh tag 314 can be different.

Step 530

The at least three mesh tags 314-1 to 314-6 measure a Received Signal Strength Indicator, RSSI, of the received broadcast message from the target tag 310. The units of the signal strength are db and dbm.

Step 540

The measured RSSIs are transmitted from each of the mesh tags 314 that the received the broadcast message to the target tag 310

Step 550

The target tag 310 selects a subset of the mesh tags 314 which have the highest RSSIs. The selected subset of the mesh tags are called proximity tags, e.g. 314-2, 314-3, 314-5, 314-6, shown as dashed mesh tags in FIG. 3. Obviously the selected proximity tags 314-2, 314-3, 314-5, 314-6 are those tags which have less obstacles between the proximity tags and the target tag 310, or the mesh tags which are closer to the target tag 310 if they are located in an open area.

Step 570

After the proximity tags 314-2, 314-3, 314-5, 314-6 are selected, the target tag 310 performs a Time of Flight, ToF measurement with all the proximity tags. The Time of Flight, ToF, is a common method for measuring the distance between two objects, based on the time difference between the emission of a signal and its return to one object, after being reflected by the other object.

Step 580

After the ToF measurements with all the proximity tags 314-2, 314-3, 314-5, 314-6 are finished, the target tag 310 calculates a real time position of itself based on the results of the ToF measurements.

According to a preferred embodiment, the target tag 310 performs ToF measurements with all the proximity tags in a Round Robin manner. The number of Round Robins is the number of proximity tags. In the system illustrated in FIG. 3, since there are four proximity tags 314-2, 314-3, 314-5, 314-6, the number of Round Robins is four. Furthermore, the number of Round Robins (or the number of selected proximity tags) is chosen based on the RSSI measurements previously obtained. In general terms, a stronger signal between a target tag and a mesh tag means that the ToF measurement result is more accurate, so the system can decide on the fly how many Round Robins are needed to obtain a specified positional accuracy. That is, the system can decide on the fly how many proximity tags that should be selected.

In addition, more Round Robins lead to greater accuracy, because the phase of the clock signal which generates the timing reference is different in each Round Robin. Therefore timing inaccuracies caused by phase differences can be averaged over several Round Robin events, leading to greater accuracy in the positioning result.

According to a preferred embodiment, the target tag 310 sends the broadcast message to all the mesh tags 314 with a bit rate of 5 kbps to 500 kbps, preferably with a bit rate of 50 kbps. The coverage of the broadcast message is larger with lower bit rate. This choice of bit rate will ensure that there is no coverage limitation in the broadcasting step.

According to a preferred embodiment, an optional step 560 is performed. In step 560, the target tag 310 determines a bit rate of the signal used in the ToF measurements. The bit rate is determined based on the received RSSIs from all the proximity tags 314. Furthermore, the bit rate used in the ToF measurements is in the range of 50 kbps to 500 kbps. The coverage of ToF measurements can be enhanced by reducing the bit rates.

According to a preferred embodiment, RSSI positioning is performed while the target tag 310 is changing location, and the ToF measurement is used when the target tag 310 has stopped changing location. The RSSI positioning is used while the target tag 310 is in motion (i.e. changing geographic location) because the RSSI process is fast to execute. Aggregating the RSSI measurements in the mesh tags 314 from a single measurement instance provides enough data to produce an approximate position of the tag. However, the ToF measurement process on the other hand takes a longer time to produce a position result, since it requires a minimum of three consecutive ToF measurements (i.e. a ToF measurement process to three individual proximity tags, performed in sequence one after another). In this instance, if the target tag 310 is changing location, there will be a position error in the result due to the target tag 310 having changed location during the measurement process. The size of the error will be proportional to the velocity of the target tag 310. Thus the ToF process is better suited to target tags that have stopped moving (changing location).

According to a preferred embodiment, the movement of a target tag 310 is determined by using a combination of inertial sensors contained within the target tag 310, and RSSI data obtained from the mesh tags 314.

According to a preferred embodiment, the method may also choose within each ToF measurement how many timing packets that are transmitted between the target tag 310 and proximity tags. Approximately 40 data packets are transmitted back and forth between a target tag 310 and a proximity tag in one single ToF measurement instance. However this number can be varied-fewer packets make the process faster but reduce the accuracy obtained; more packets increase the accuracy obtained but make the process longer.

Figure 6:
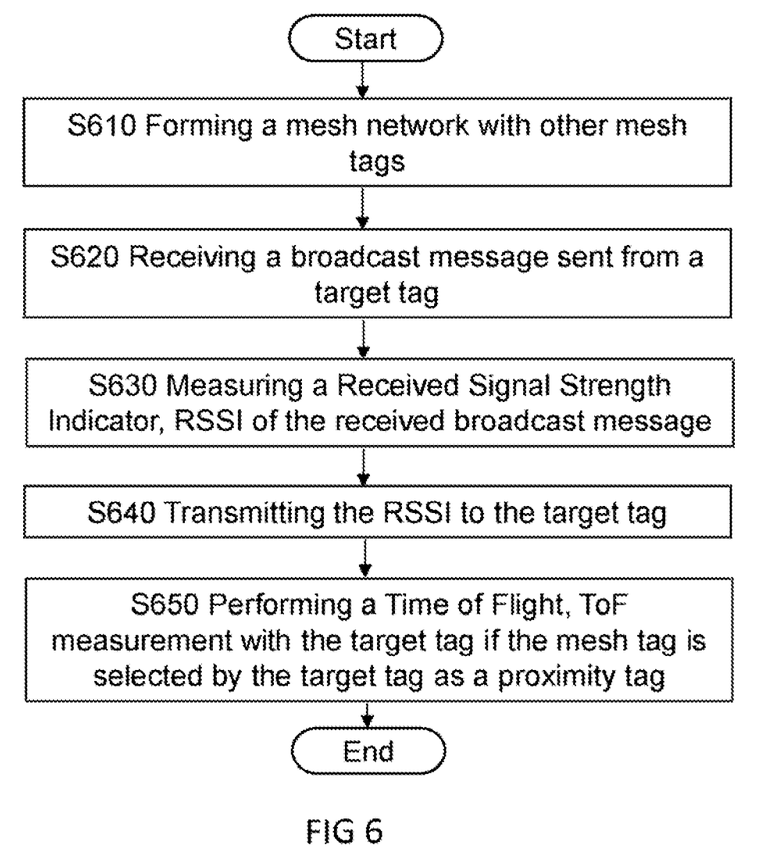
FIG. 6 is a flowchart schematically illustrating embodiments of a method performed in a mesh tag according to embodiments herein.

FIG. 6 is a flowchart schematically illustrating embodiments of a method performed in a mesh tag according to embodiments herein.

Step 610

A mesh tag 314-2 forms a mesh network with other mesh tags 314-1, 314-3, 314-4, 314-5, 314-6. The mesh tags 314 form the mesh network so that it is ensured that a target tag 310 can communicate with at least three mesh tags at any given location of the target tag on the construction site.

Step 620

The mesh tag 314-2 receives a broadcast message sent from the target tag 310.

Step 630

The mesh tag 314-2 measures a Received Signal Strength Indicator, RSSI of the received broadcast message.

Step 640

The mesh tag 314-2 transmits the measured RSSI to the target tag.

Step 650

When the mesh tag 314-2 is selected by the target tag 310 as the proximity tag, the mesh tag 314-2 performs a Time of Flight, ToF measurement with the target tag 310.

Figure 7:
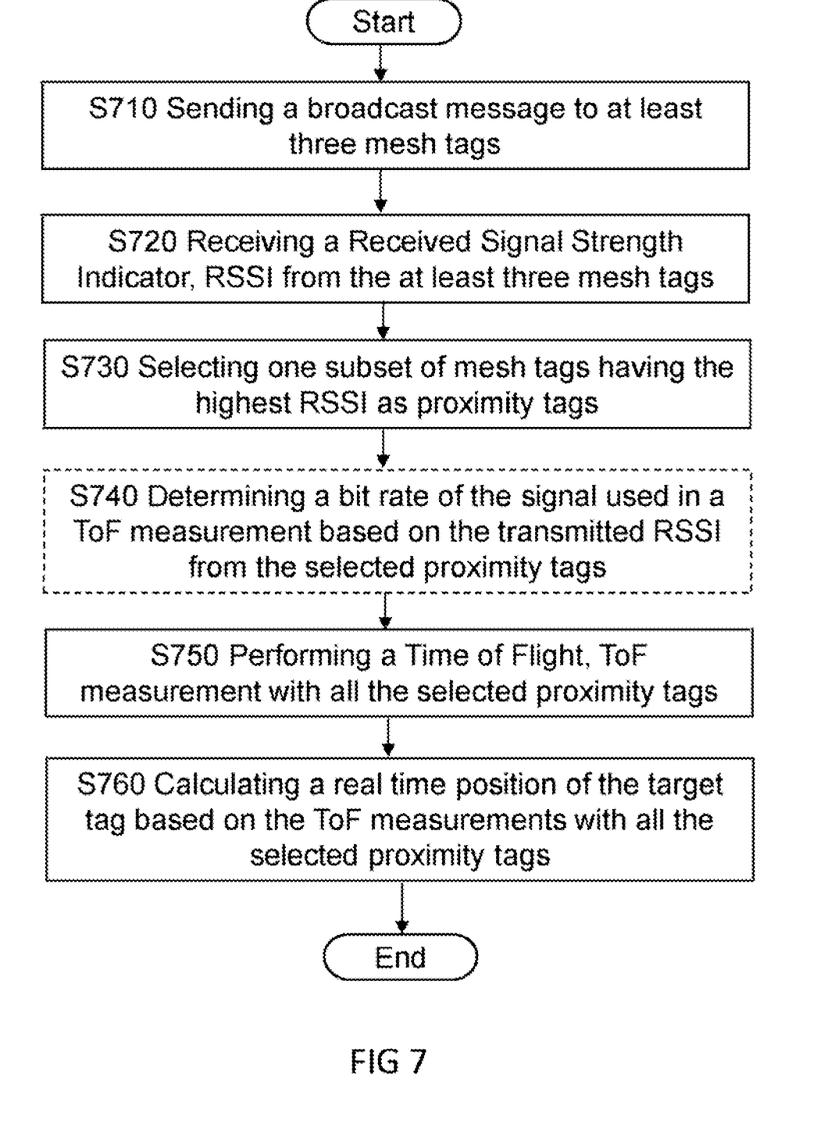
FIG. 7 is a flowchart schematically illustrating embodiments of a method performed in a target tag according to embodiments herein.

FIG. 7 is a flowchart schematically illustrating embodiments of a method performed in a target tag according to embodiments herein.

Step 710

A target tag 310 sends a broadcast message to all the mesh tags 314-1 to 314-6.

Step 720

The target tag 310 receives the RSSIs from each mash tag 314. Each mesh tag has finished a RSSI measurement after receiving the broadcast message in step 710.

Step 730

The target tag 310 selects on subset of mesh tags which have the highest RSSIs as proximity tags. In the situation illustrated in FIG. 3, the selected mesh tags are 314-2, 314-3, 314-5, 314-6.

Step 750

The target tag 310 performs a Time of Flight, ToF measurement with each of the selected proximity tags.

Step 760

The target 210 calculates a real time position of itself based on the ToF measurements with all the selected proximity tags 314-2, 314-3, 314-5, 314-6.

According to a preferred embodiment, an optional step 740 is performed after the step 730. In the step 740, the target tag 310 determines a bit rate of the signal used in the ToF measurements. The bit rate is determined based on the received RSSIs from all the proximity tags 314. Furthermore, the bit rate used in the ToF measurements is in the range of 50 kbps to 500 kbps. The coverage of ToF measurements can be enhanced by reducing the bit rates.

According to a preferred embodiment, the target tag 310 perform ToF measurements with all the proximity tags in a Round Robin manner. The number of Round Robins is the number of proximity tags. In the system illustrated in FIG. 3, since there are four proximity tags 314-2, 314-3, 314-5, 314-6, the number of Round Robins is four. Furthermore, the number of Round Robins (or the number of selected proximity tags) is chosen based on the RSSI measurements previously obtained. In general terms, a stronger signal between a target tag and a mesh tag means that the ToF measurement result is more accurate, so the system can decide on the fly how many Round Robins are needed to obtain a specified positional accuracy. That is, the system can decide on the fly how many proximity tags that should be selected.

In addition, more Round Robins lead to greater accuracy, because the phase of the clock signal which generates the timing reference is different in each Round Robin. Therefore timing inaccuracies caused by phase differences can be averaged over several Round Robin events, leading to greater accuracy in the positioning result.

According to a preferred embodiment, the target tag 310 sends the broadcast message to all the mesh tags 314 with a bit rate of 5 kbps to 500 kbps, preferably with a bit rate of 50 kbps. The coverage of the broadcast message is larger with lower bit rate. This choice of bit rate will ensure that there is no coverage limitation in the broadcasting step.

Figure 8:
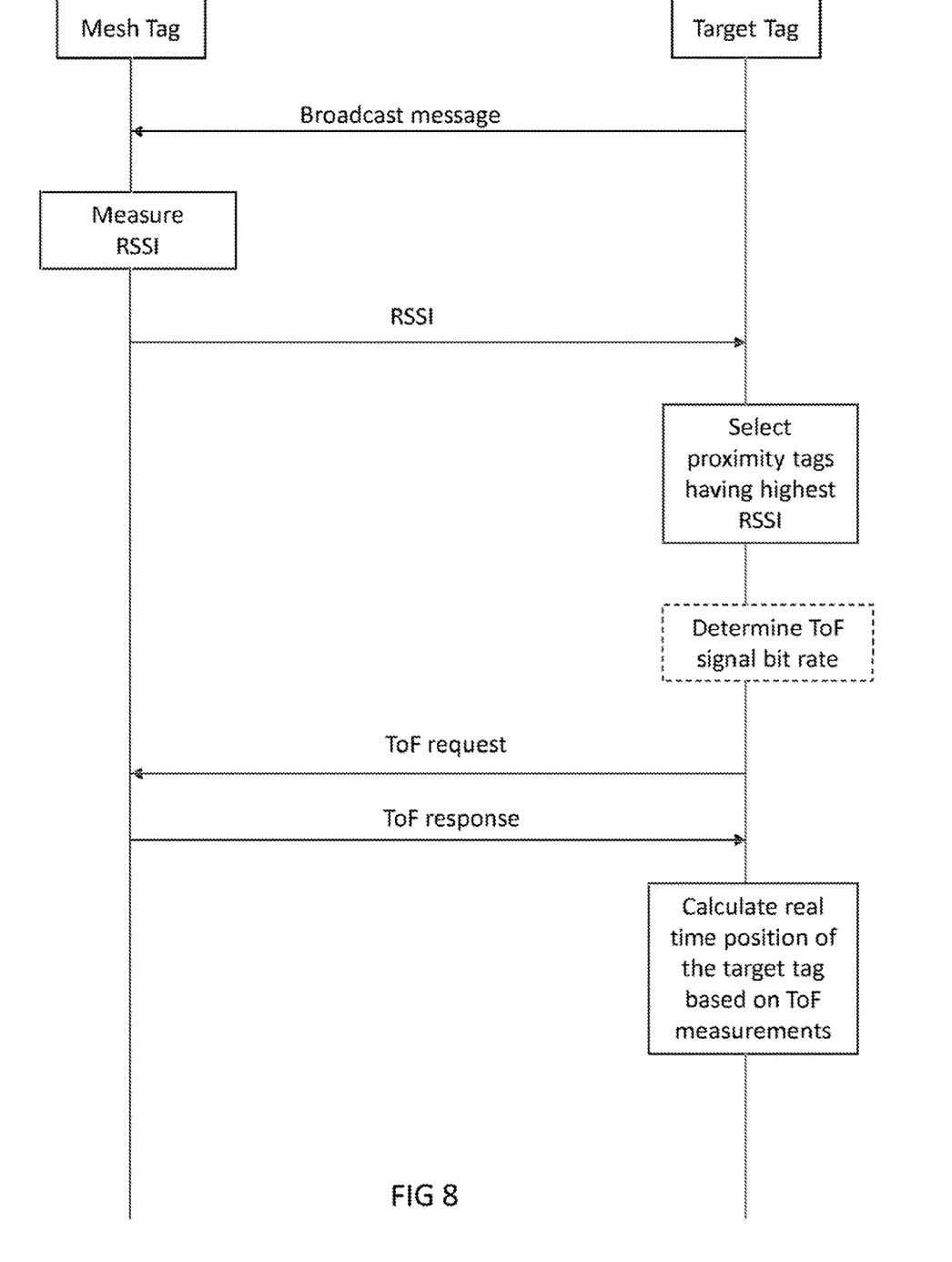
FIG. 8 is an interaction diagram for illustrating embodiments of the method performed in the real time location system.

FIG. 8 is an interaction diagram for illustrating embodiments of the method performed in the real time location system.

In the interaction diagram, one target tag sends a broadcast message. The mesh tag performs a RSSI measurement when receiving the broadcast message. After the measurement, the mesh tag transmits the measured RSSI back to the target tag. The target tag selects proximity tags which have highest RSSIs based on all the received RSSIs from all the mesh tags. A ToF signal bit rate is also determined by the target tag. If the mesh tag has been selected by the target tag as a proximity tag, the target tag performs a ToF measurement with the mesh tag. That is, the target tag sends a ToF request to the mesh tag, and the mesh tag reflects a ToF response to the target tag. After the ToF measurement, the target tag calculates its real time position accordingly. If the mesh tag is not selected as a proximity tag, the method is terminated on the mesh tag.

Please note that any enumerating terminology used herein, such as first device, second device, etc., should as such be considered non-limiting and the terminology as such does not imply a certain hierarchical relation. Without any explicit information in the contrary, naming by enumeration should be considered merely a way of accomplishing different names.

As used herein, the expression "configured to" may e.g. mean that a processing circuit is configured to, or adapted to, by means of software or hardware configuration, perform one or more of the actions described herein.

As used herein, the terms "number" or "value" may refer to any kind of digit, such as binary, real, imaginary or rational number or the like. Moreover, "number" or "value" may be one or more characters, such as a letter or a string of letters. Also, "number" or "value" may be represented by a bit string.

As used herein, the expression "may" and "in some embodiments" has typically been used to indicate that the features described may be combined with any other embodiment disclosed herein.

In the drawings, features that may be present in only some embodiments are typically drawn using dotted or dashed lines.

When using the word "comprise" or "comprising" it shall be interpreted as nonlimiting, i.e. meaning "consist at least of".

The embodiments herein are not limited to the above described preferred embodiments. Various alternatives, modifications and equivalents may be used. Therefore, the above embodiments should not be taken as limiting the scope of the present disclosure, which is defined by the appending claims.

The invention claimed is:

1. A wireless real time positioning system comprising a mesh network of mesh tags and a target tag provided on a movable object and wherein each mesh tag comprises a first processing unit and a first memory and the target tag comprises a second processing unit and a second memory, said first and second memories comprising instructions which when executed by the processing units cause the system to:
   send a broadcast message from the target tag,
   receive the broadcast message in at least three mesh tags,
   measure a Received Signal Strength Indicator, RSSI, of the received broadcast message in the at least three mesh tags,
   transmit the RSSI from the at least three mesh tags to said target tag,
   select, in the target tag, one subset of mesh tags having the highest RSSI as proximity tags,
   perform a Time of Flight, ToF, measurement, in the target tag, with all the selected proximity tags, and
   calculate, in the target tag, a real time position of the target tag based on the ToF measurements with all the selected proximity tags.

2. The system as claimed in claim 1, wherein the target tag is further caused to perform ToF measurements with all the proximity tags in a Round Robin manner, and wherein the target tag is configured with the selected number of proximity tags as the number of Round Robins.

3. The system as claimed in claim 2, wherein the target tag is further caused to determine the number of Round Robins based on the quality of the previously measured RSSI measurements, the higher the RSSI quality the fewer Round Robins.

4. The system as claimed in claim 1, wherein the target tag is further caused to send the broadcast message with a bit rate of 5 kbps to 500 kbps, preferable with a bit rate of 50 kbps.

5. The system as claimed in claim 1, wherein the target tag is further caused to determine the bit rate of the signal used in said ToF measurement based on the transmitted RSSI from the selected proximity tags, preferably in the range of 50 kbps to 500 kpbs.

6. The system as claimed in claim 1, wherein the target tag is caused to determine a number of packets transmitted between the target tag and the selected proximity tags in each ToF measurement.

7. The system as claimed in claim 1, wherein the system also comprises a gateway, and the target tag and mesh tags comprised in the system are wirelessly connected to the gateway.

8. A wireless real time positioning method performed by a system comprising a mesh network of multiple mesh tags and a target tag provided on a moveable object, the method comprising:
   sending (S510) a broadcast message from the target tag,
   receiving (S520) the broadcast message in at least three mesh tags,
   measuring (S530) a Received Signal Strength Indicator, RSSI, of the received broadcast message in the at least three mesh tags,
   transmitting (S540) the RSSI from the at least three mesh tags to said target tag,
   selecting (S550), in the target tag, one subset of mesh tags having the highest RSSIs as proximity tags,
   performing (S570) a Time of Flight, ToF, measurement, in the target tag, with all the selected proximity tags, and
   calculating (S580), in the target tag, a real time position of the target tag based on the ToF measurements with all the selected proximity tags.

9. A wireless real time positioning method as claimed in claim 8, wherein performing (S570) the ToF measurements with all the proximity tags is done in a Round Robin manner, and the selected number of proximity tags is the number of Round Robins.

10. A wireless real time positioning method as claimed in claim 9, further comprising determining (S555) the number of Round Robins based on the quality of the previously measured RSSI measurements, the higher the RSSI quality the fewer Round Robins.

11. A wireless real time positioning method as claimed in claim 8, wherein sending (S510) the broadcast message is performed with a bit rate of 5 kbps to 500 kbps, preferable with a bit rate of 50 kbps.

12. A wireless real time positioning method as claimed in claim 8, further comprising determining (S560) the bit rate of the signal used in said ToF measurement based on the transmitted RSSI from the selected proximity tags, preferably in the range of 50 kbps to 500 kpbs.

13. A wireless real time positioning method as claimed in claim 8, further comprising determining the number of packets transmitted between the target tag and the proximity tags in each ToF measurement.

* * * * *